(12) United States Patent  
Liao

(10) Patent No.: US 8,827,485 B2  
(45) Date of Patent: Sep. 9, 2014

(54) MAGNETIC CONTROL ILLUMINATION DEVICE

(71) Applicant: Liang-Cheng Liao, New Taipei (TW)

(72) Inventor: Liang-Cheng Liao, New Taipei (TW)

( * ) Notice: Subject to any disclaimer, the term of this patent is extended or adjusted under 35 U.S.C. 154(b) by 203 days.

(21) Appl. No.: 13/645,944

(22) Filed: Oct. 5, 2012

(65) Prior Publication Data

US 2014/0098524 A1  Apr. 10, 2014

(51) Int. Cl.
*F21L 4/00* (2006.01)
*H04M 1/22* (2006.01)

(52) U.S. Cl.
USPC ........... 362/191; 362/269; 362/287; 362/396; 362/398; 362/430

(58) Field of Classification Search
USPC ............... 362/183, 190–191, 249.02–249.05, 362/269, 275, 285, 396, 398, 418–419, 362/427–428, 430
See application file for complete search history.

(56) References Cited

U.S. PATENT DOCUMENTS 8,172,436 B2 * 5/2012 Coleman et al. .............. 362/421

* cited by examiner

*Primary Examiner* — Jason Moon Han
(74) *Attorney, Agent, or Firm* — Ming Chow; Sinorica, LLC

(57) ABSTRACT

A magnetic control illumination device comprises: a lighting member and a fixing base connecting with the back surface of the lighting member, the lighting member has at least one lighting component, a battery, a control circuit with a magnetic reed switch, the fixing base has at least one tenon structure and at least one powerful magnet. The magnetic control illumination device can be disposed in an umbrella, bicycle or safety helmet via buckling ring or powerful magnet, and control illumination function by means of the magnetic reed switch.

9 Claims, 13 Drawing Sheets

MAGNETIC CONTROL ILLUMINATION DEVICE

BACKGROUND OF THE INVENTION

1. Field of the Invention

The present invention generally relates to a magnetic control illumination device, more particularly to an illumination device that is disposed in an umbrella, bicycle or safety helmet.

2. Description of the Prior Art

The disadvantages of illumination devices (flashlights) of present umbrellas, bicycles and safety helmets are listed below:

1. General illumination devices (flashlights) are turned on and off by push button switches, and such design brings some inconveniences while a user wears gloves.
2. Since the push button switches of general illumination devices (flashlights) are mechanical structures and are operated in a long period, the life of the push button switches may not be lasted longer.
3. The illumination directions of general illumination devices (flashlights) are according to users' decisions or lighting members, therefore once such general illumination devices are positioned, the directions and angles of illumination may not be easily changed.

As a conclusion, the general illumination devices (flashlights) of the presently sold or developed umbrellas, bicycles and safety helmets shall be improved to further technical levels.

Therefore, to design an illumination device that uses a simple behaviors of upwardly taking-off and downwardly closing to turn on and off on umbrellas, bicycles and safety helmets, and the illumination directions and angles of the illumination device can be adjusted by user shall be a best solution.

SUMMARY OF THE INVENTION

The main objective of the present invention is to provide a magnetic control illumination device, which is disposed in an umbrella, bicycle, safety helmet, the surface of a metal member, or a surface that is internally disposed a metal member.

The another objective of the present invention is to provide the magnetic control illumination device, which makes that the user uses the behaviors of upwardly taking-off and downwardly closing to turn on a lighting member.

The another objective of the present invention is to provide the magnetic control illumination device, which makes that the user easily adjust the direction and angle of illusion of the lighting member.

To reach aforesaid objectives, the magnetic control illumination device 1 comprises: a lighting member 11 and a fixing base 12 connecting with the back surface of the lighting member 11, the lighting member 11 having at least one lighting component 111, a battery 112, a control circuit 113 with a magnetic reed switch 114, the fixing base 12 having at least one tenon structure 121 and at least one powerful magnet 122.

Practically, the lighting member 11 connects with the fixing base 12 via a pivot structure 13, the pivot structure 13 lets that the lighting member 11 opens and closes on the fixing base 12 in a multi-stage way for adjusting plural lighting angles.

Practically, the lighting member 11 further comprises a control switch 115 connecting with the magnetic reed switch 114, the control switch 115 has three states of continuous illumination, continuous non-illumination and automatic illumination.

Practically, the powerful magnet 122 is disposed on the surface of the fixing base 12.

Practically, the lighting member 11 attaches to the surface of a metal member or the surface, which internally is a metal material, of a member via the powerful magnet 122 of the fixing base 12, or the lighting member 11 directly attaches to the shaft 32 or the ribs 33 through the powerful magnet 122 of the fixing base 12.

Practically, the lighting member 11 connects with a buckling ring 2 with a tenon base 21, the tenon structure 121 of the lighting member 11 inserts into the tenon base 21 for the lighting member 11 buckling up the buckling ring 2.

Practically, the bottom of the tenon base 21 of the buckling ring 2 has a shaft for the tenon base 21 rotating on the buckling ring 2.

Practically, the buckling ring 2 buckles up the lower runner 31 of an umbrella 3 or the horizontal rod 41 or the vertical rod 42 of a bicycle.

Practically, the lighting member 11 further has a solar panel connecting with the battery 112 for charging the battery 112.

Practically, the lighting member 11 further has a USB connector 116 connecting with the battery 112 for charging the battery 112.

Other and further features, advantages, and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits, and advantages of the preferred embodiments of the present invention will be readily understood by the accompanying drawings and detailed descriptions, wherein.

DETAILED DESCRIPTION OF THE INVENTION

Figure 1A:
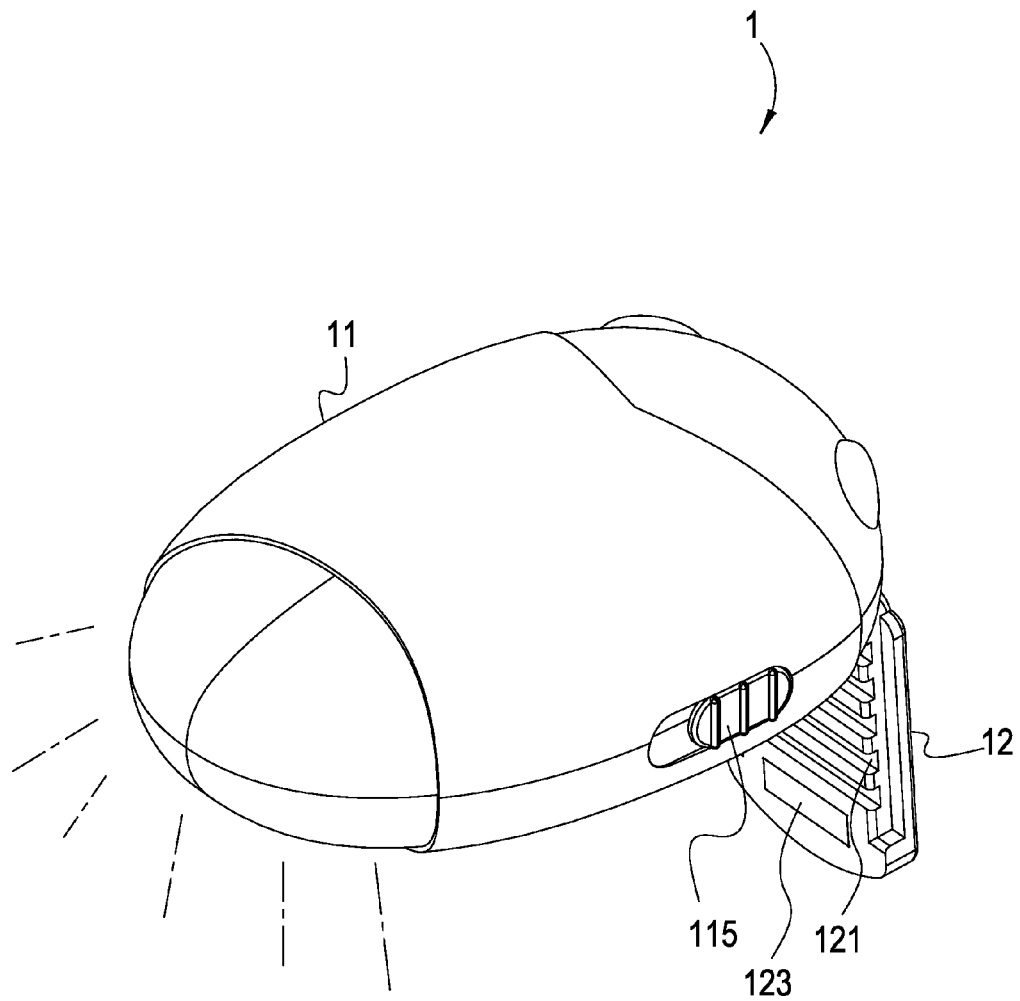
FIG. 1A illustrates a schematic lateral 3-D view of the magnetic control illumination device of the present invention.
Figure 1B:
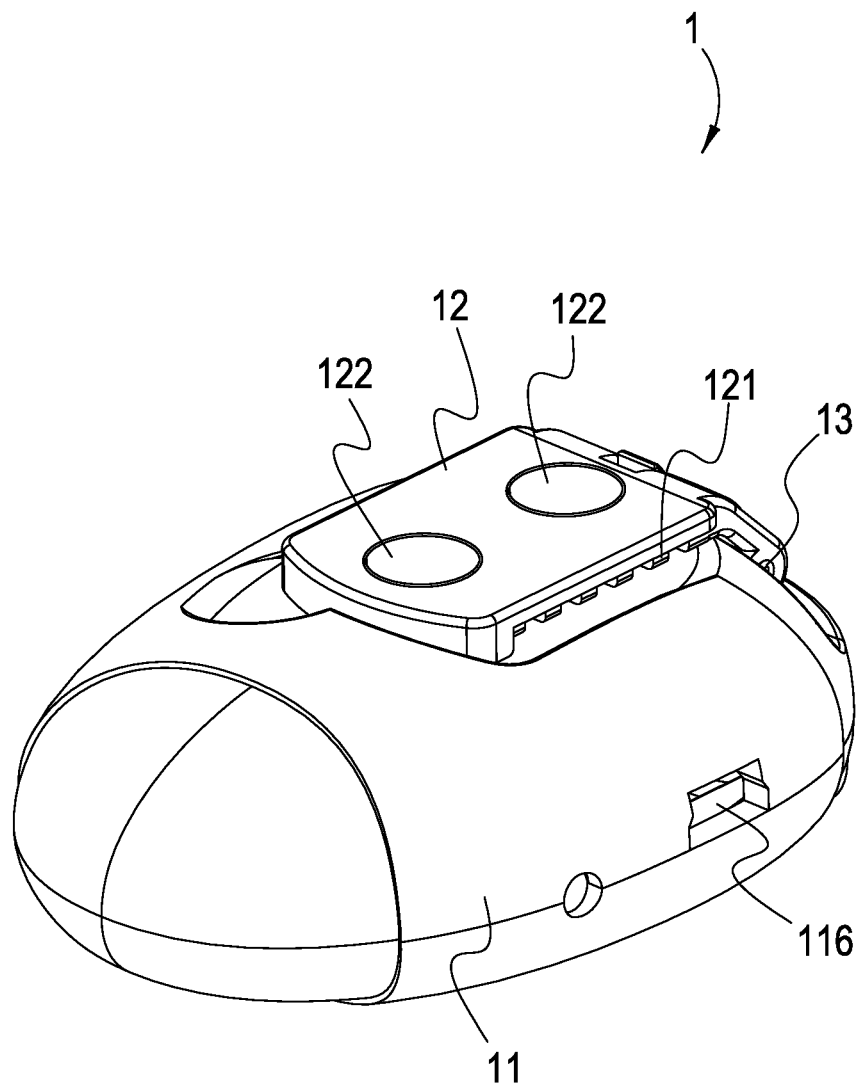
FIG. 1B illustrates another schematic lateral 3-D view of the magnetic control illumination device of the present invention.
Figure 1C:
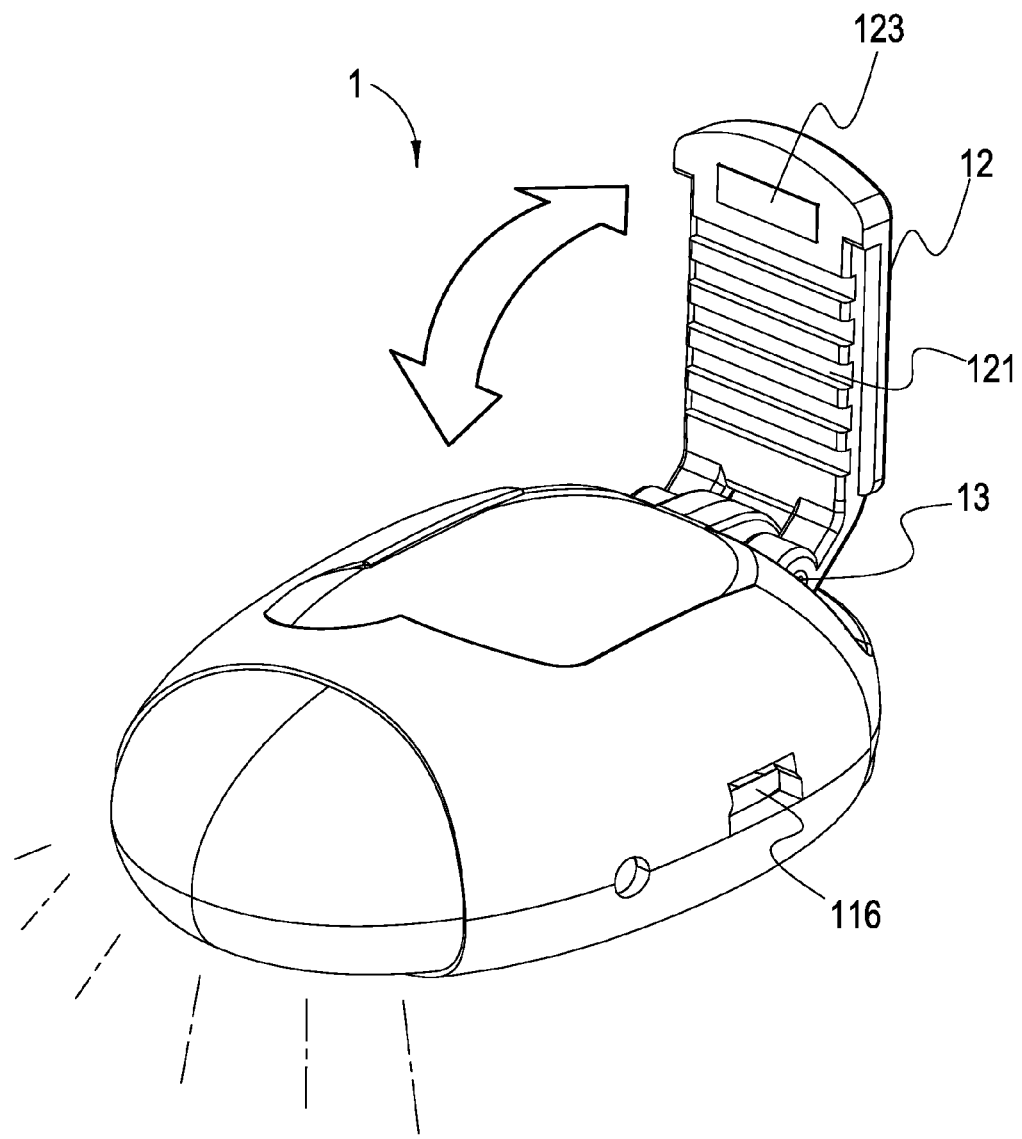
FIG. 1C illustrates a schematic lateral 3-D view of activating lighting of the magnetic control illumination device of the present invention.

Following preferred embodiments and figures will be described in detail so as to achieve aforesaid objects.

With references to FIG. 1A, FIG. 1B, FIG. 1C, and FIG. 2, which illustrate a schematic lateral 3-D view of the magnetic control illumination device of the present invention, another schematic lateral 3-D view of the magnetic control illumination device of the present invention, a schematic lateral 3-D view of activating lighting of the magnetic control illumination device of the present invention, and a schematic view of a control circuit of the magnetic control illumination device of the present invention. As shown in figures, the magnetic control illumination device 1 includes: a lighting member 11 and a fixing base 12 connecting with the back surface of the lighting member 11, the lighting member 11 has at least one lighting component 111, a battery 112, a control circuit 113 with a magnetic reed switch 114, the fixing base 12 has at least one tenon structure 121 and at least one powerful magnet 122 (for the embodiment, one surface of the fixing base 12 has two powerful magnets 122, another surface of the fixing base 12 has one powerful magnet 123).

The lighting member 11 connects with the fixing base 12 via a pivot structure 13, the pivot structure 13 lets that the lighting member 11 opens and closes on the fixing base 12 in a multi-stage way for adjusting plural lighting angles (the maximum angle is 90°.

The lighting member 11 further has a solar panel or a USB connector 116 connecting with the battery 112 for charging the battery 112.

Figure 2:
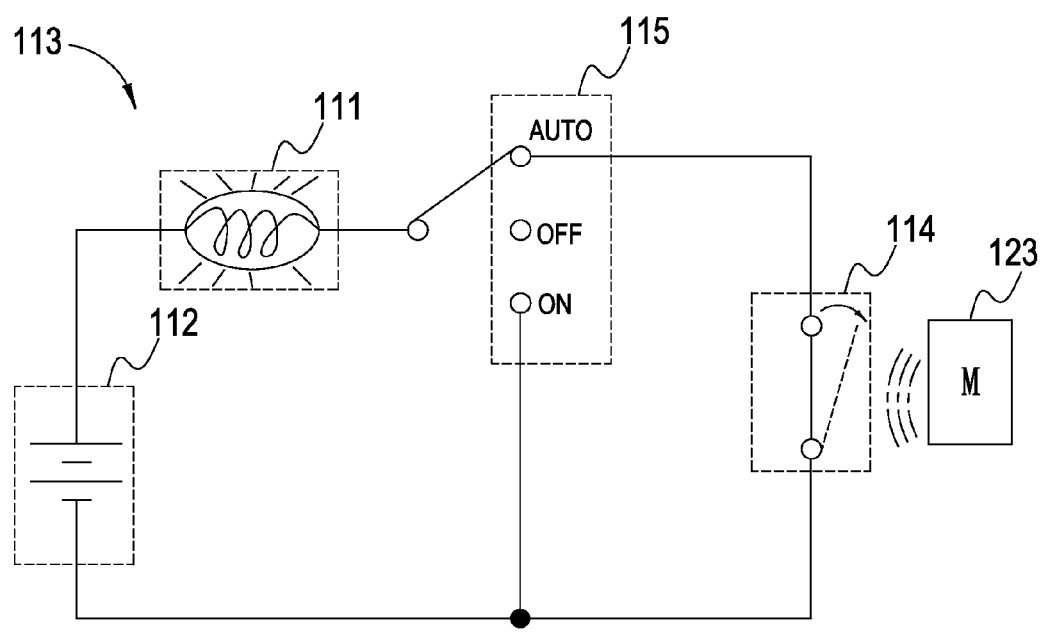
FIG. 2 illustrates a schematic view of a control circuit of the magnetic control illumination device of the present invention.

As shown in FIG. 2, the control circuit 113 further has a control switch 115 connecting with the magnetic reed switch 114, the control switch 115 has three states of continuous illumination, continuous non-illumination and automatic illumination. While the control switch 115 switches to the state of automatic illumination and the another surface of the fixing base 12 has the powerful magnet 123, the powerful magnet 123 on the another surface of the fixing base 12 may contact with the lighting member 11 in order to automatically shut down the lighting component 111 while the fixing base 12 contacts with the lighting member 11. The lighting component 111 may automatically turn on while the fixing base 12 takes off from the lighting member 11.

Figure 3A:
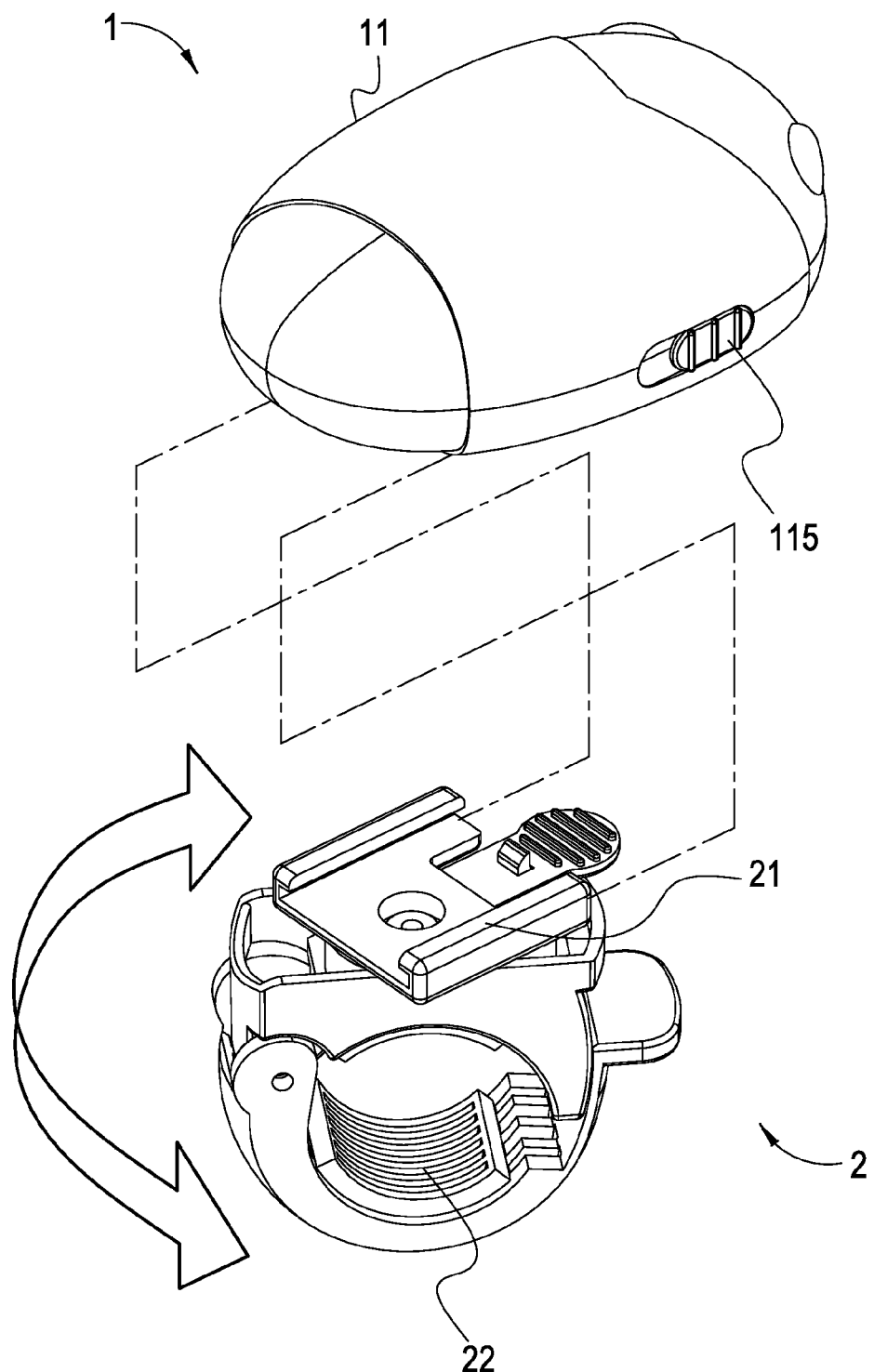
FIG. 3A illustrates a schematic exploded 3-D view of a first combination application of the magnetic control illumination device of the present invention.
Figure 3B:
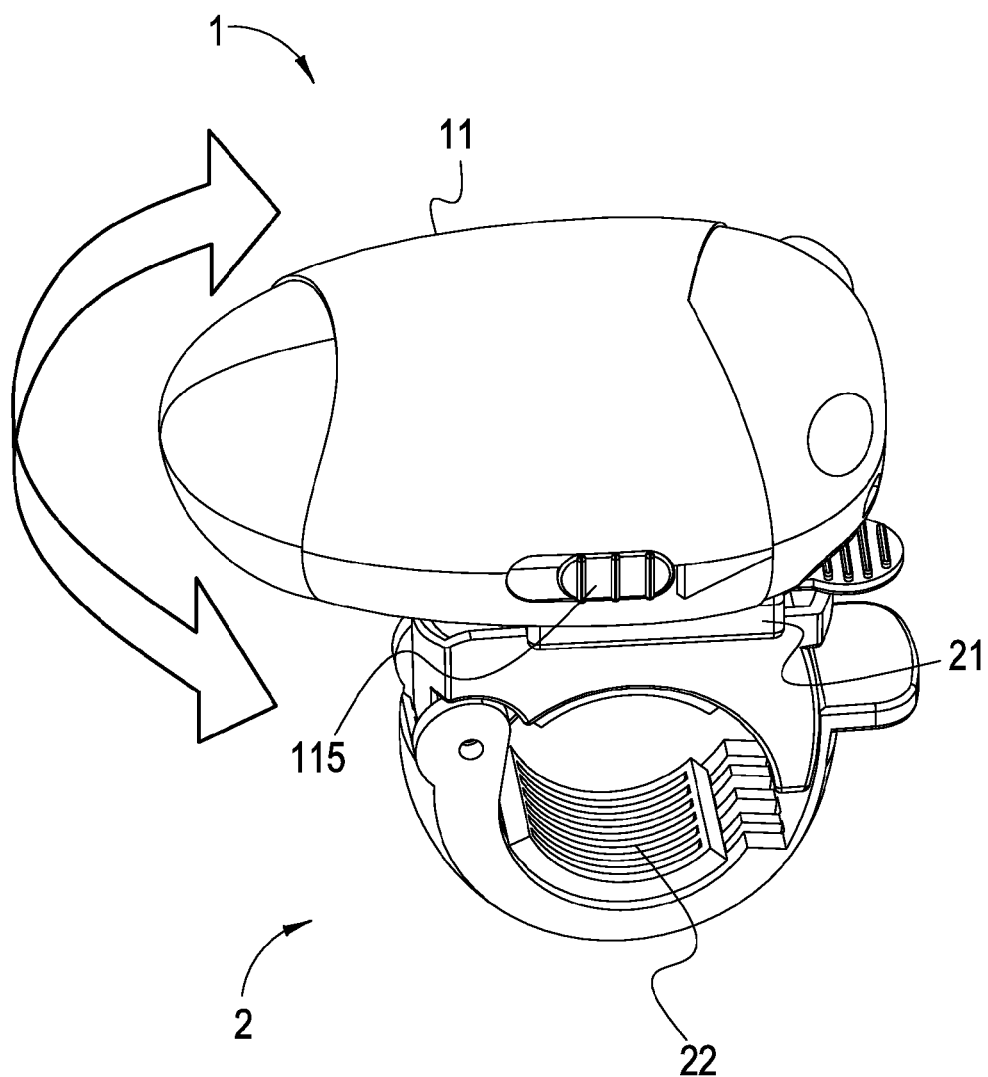
FIG. 3B illustrates a schematic assembled 3-D view of the first combination application of the magnetic control illumination device of the present invention.
Figure 3C:
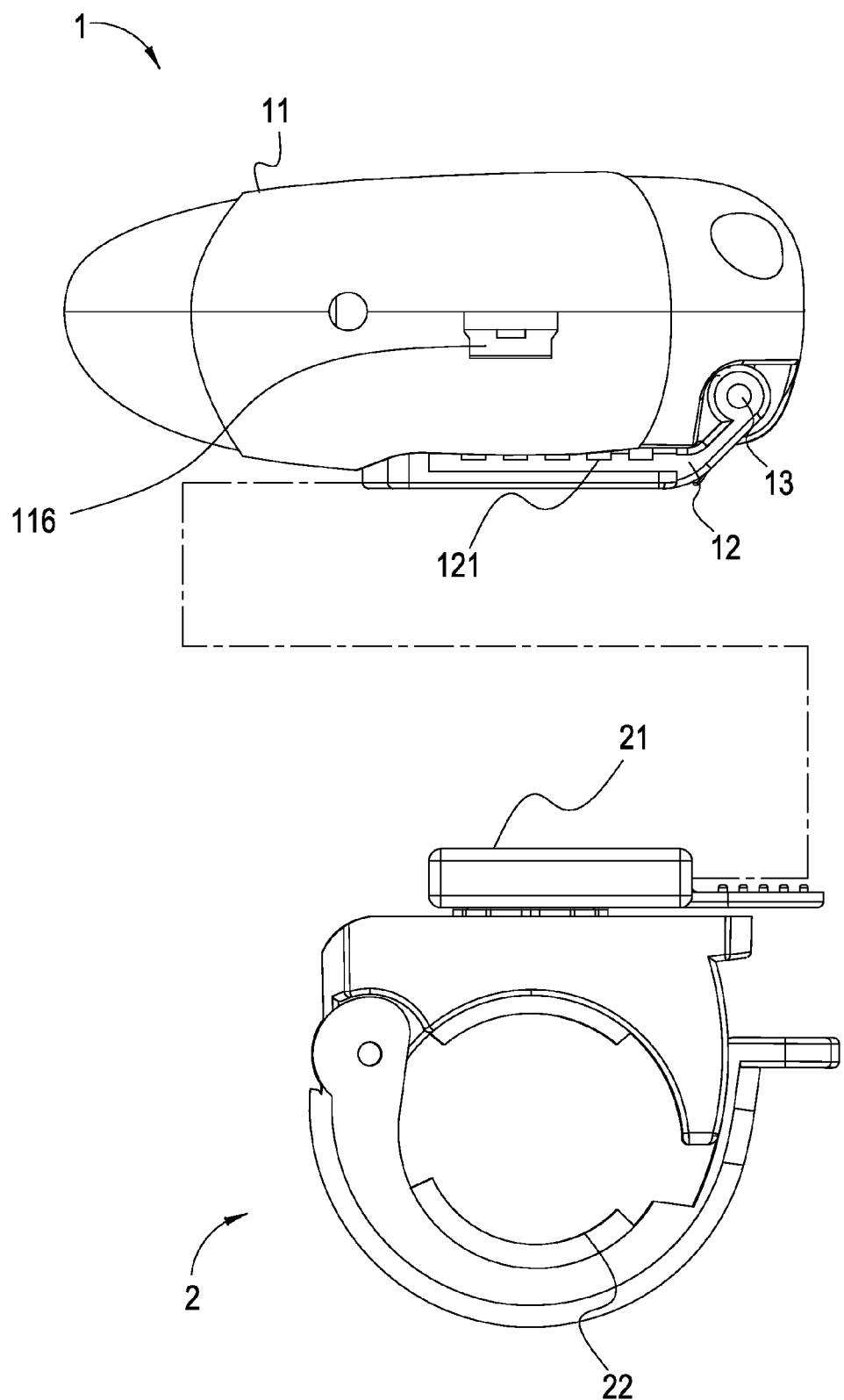
FIG. 3C illustrates a schematic profile view of the first combination application of the magnetic control illumination device of the present invention.
Figure 5A:
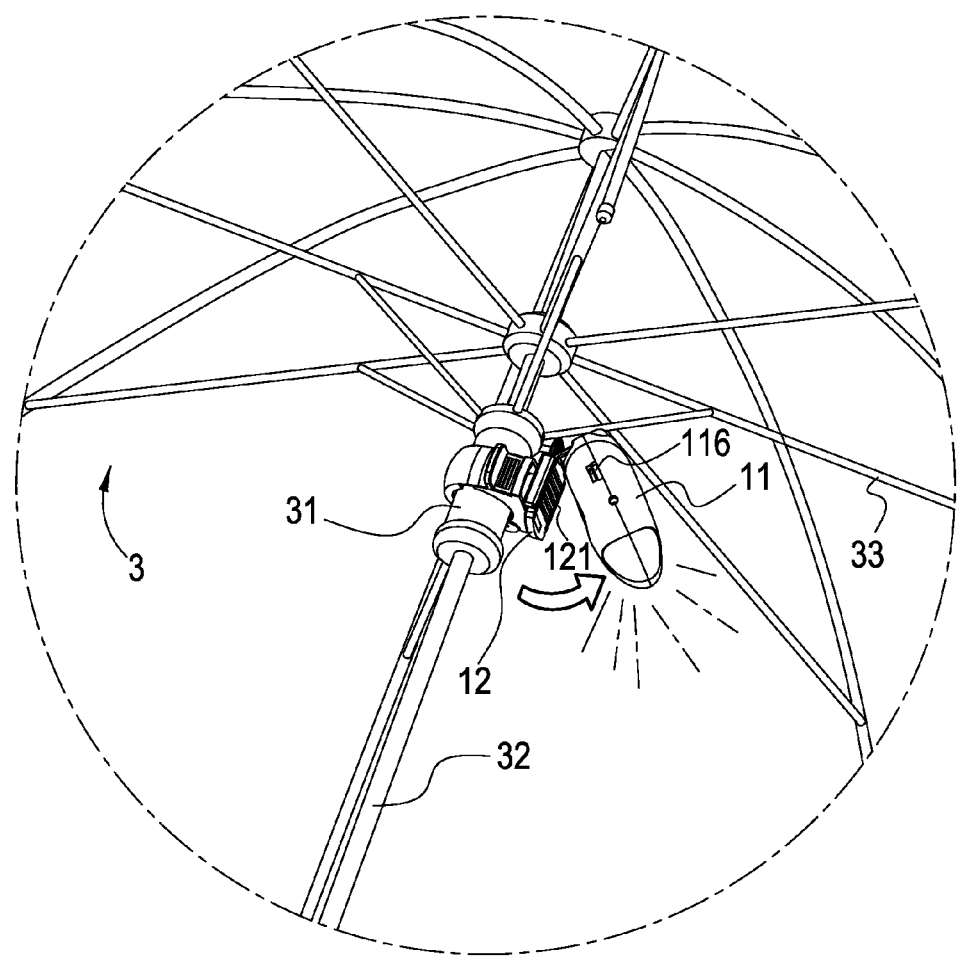
FIG. 5A illustrates a schematic view of a first application of the magnetic control illumination device of the present invention.

The lighting member 11 of the magnetic control illumination device 1 buckles up the lower runner 31 of an umbrella 3 via a buckling ring 2 (the structure of the buckling ring 2 is not restricted by the embodiment, the buckling ring 2 can be disposed a screw bolt, the screw bolt is rotated while the buckling ring 2 buckles up a column member, so that the tightness of the buckling ring 2 buckling up the column member is adjustable because of the screw bolt). The buckling ring 2, shown as in FIG. 3A, FIG. 3B and FIG. 3C, has a tenon base 21, the tenon structure 121 of the lighting member 11 inserting into the tenon base 21 for the lighting member 11 of the magnetic control illumination device 1 buckling up the buckling ring 2 (the tenon base 21 rotates on the buckling ring 2, as shown in FIG. 3B, the maximum angle is) 360°. The buckling ring 2 has a buckling open 22, as shown in FIG. 5A. The buckling open 22 of the buckling ring 2 buckles up the lower runner 31 of the umbrella 3, and the lighting member 11 turns on while a user upwardly takes the lighting member 11 off from the fixing base 12.

Figure 5B:
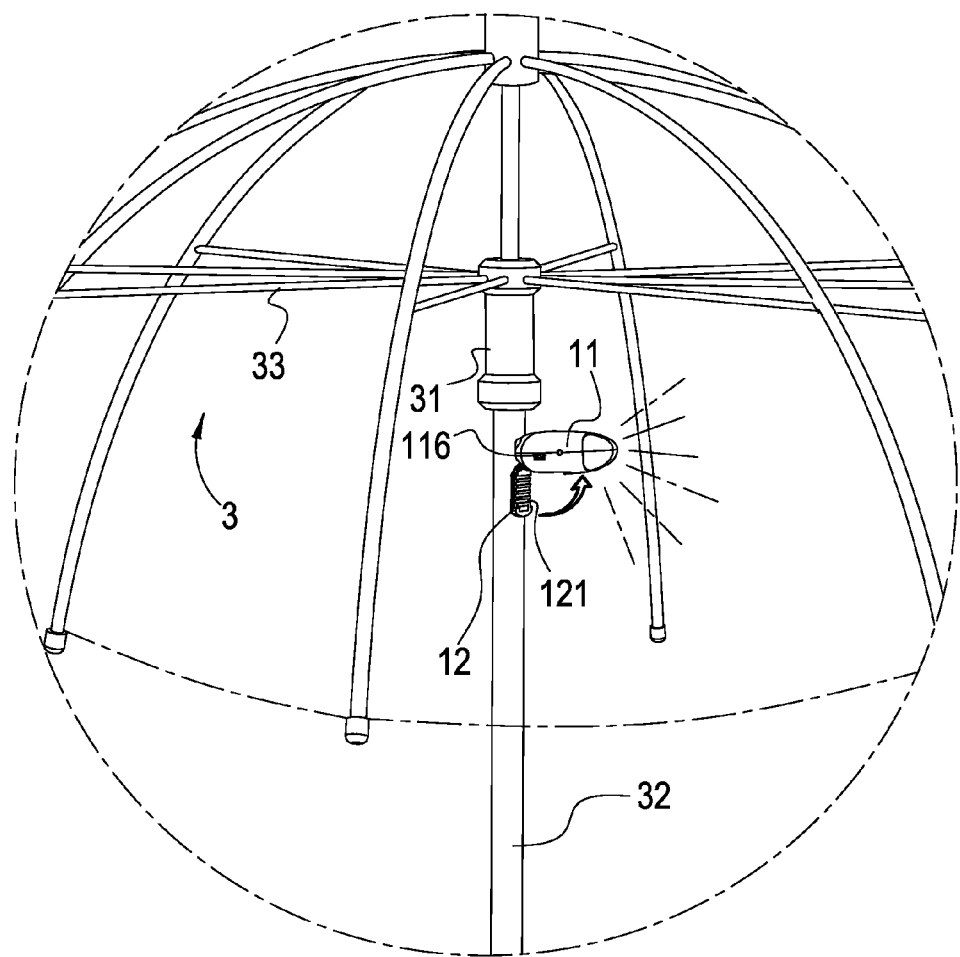
FIG. 5B illustrates a schematic view of a second application of the magnetic control illumination device of the present invention.

The surface of the fixing base 12 has two powerful magnets 122, hence the fixing base 12 of the magnetic control illumination device 1 directly attaches to the shaft 32 or the ribs 33, as shown in FIG. 5B. Similarly, the lighting member 11 turns on while the user upwardly takes the lighting member 11 off from the fixing base 12.

Figure 6A:
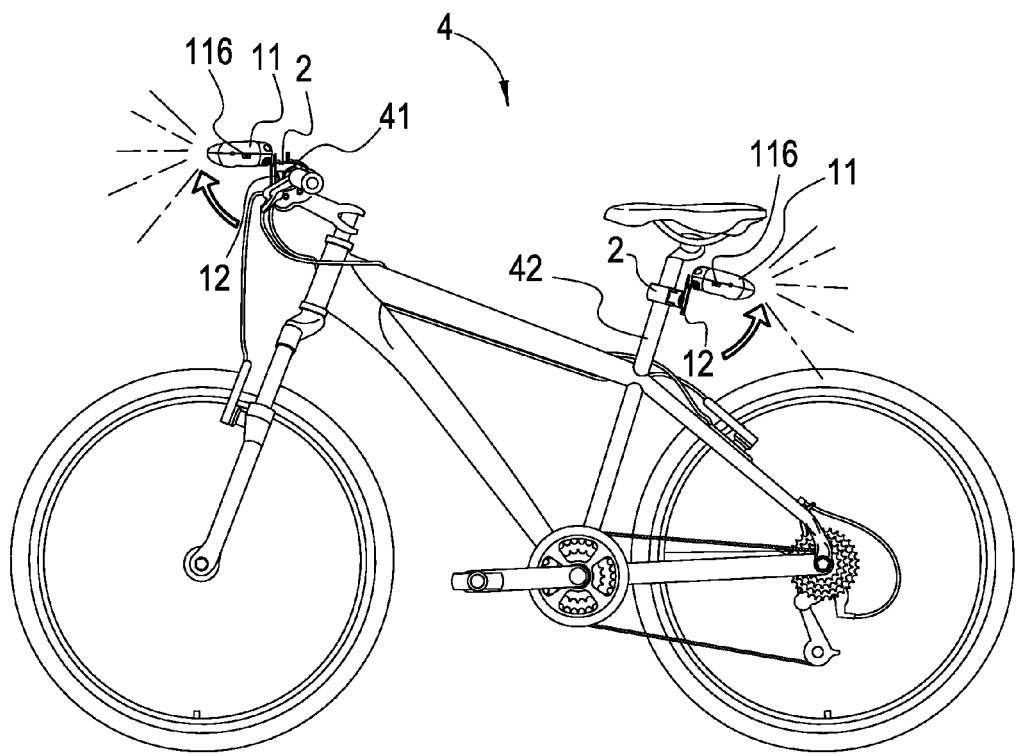
FIG. 6A illustrates a schematic view of a third application of the magnetic control illumination device of the present invention.
Figure 6B:
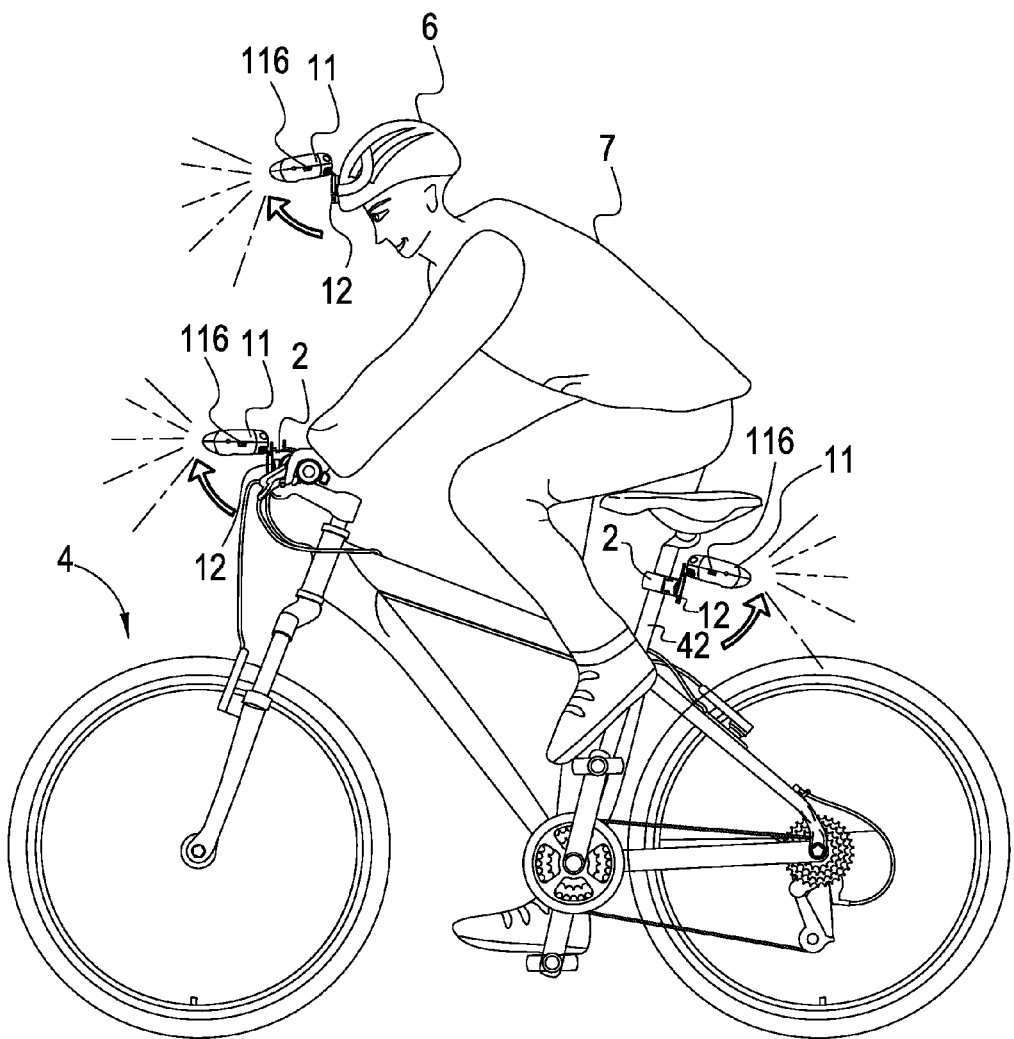
FIG. 6B illustrates a schematic view of a fourth application of the magnetic control illumination device of the present invention.

The buckling ring 2 buckles up the horizontal rod 41 or the vertical rod 42 of a bicycle 4, as shown in FIG. 6A and FIG. 6B. User is able to adjust the angle and direction of illumination while the buckling ring 2 combines with the horizontal rod 41 or the vertical rod 42 of the bicycle 4.

Figure 4A:
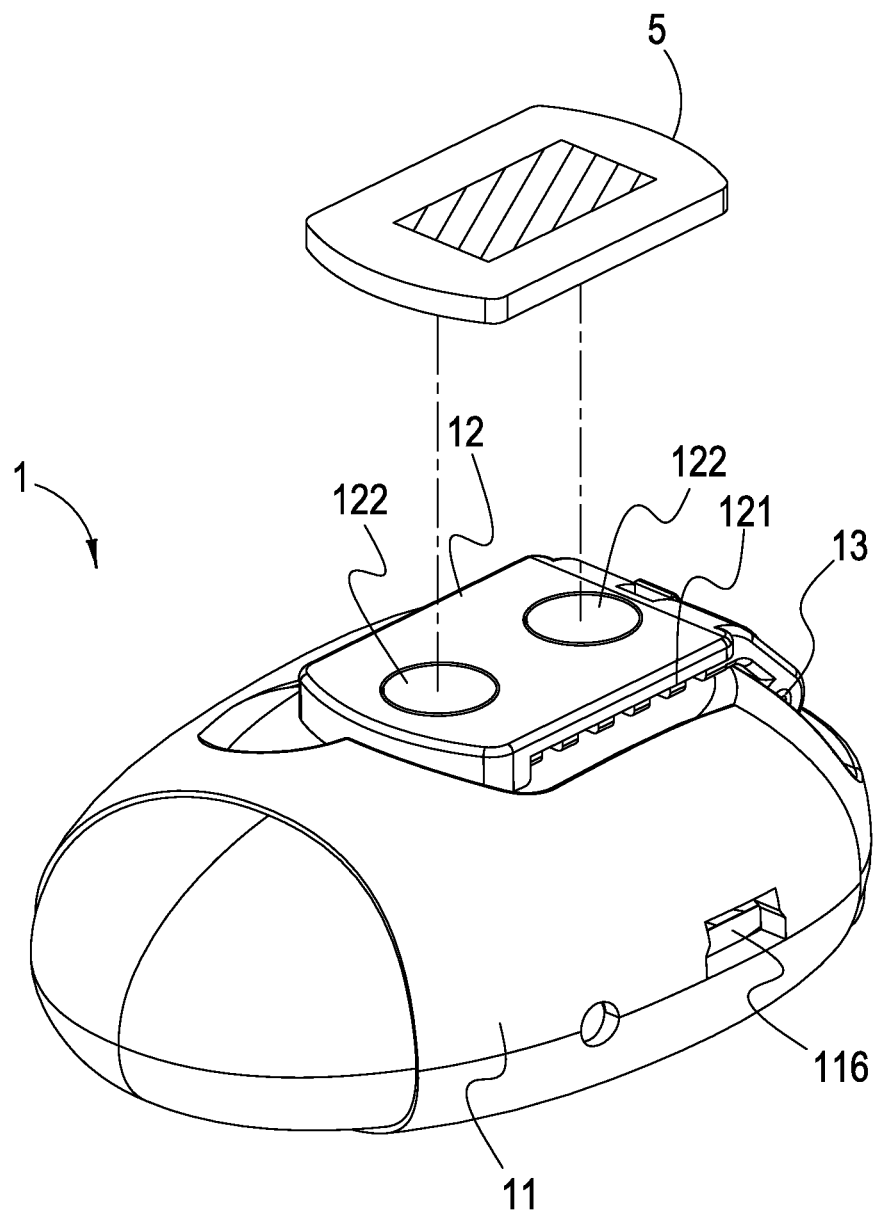
FIG. 4A illustrates a schematic exploded 3-D view of a second combination application of the magnetic control illumination device of the present invention.
Figure 4B:
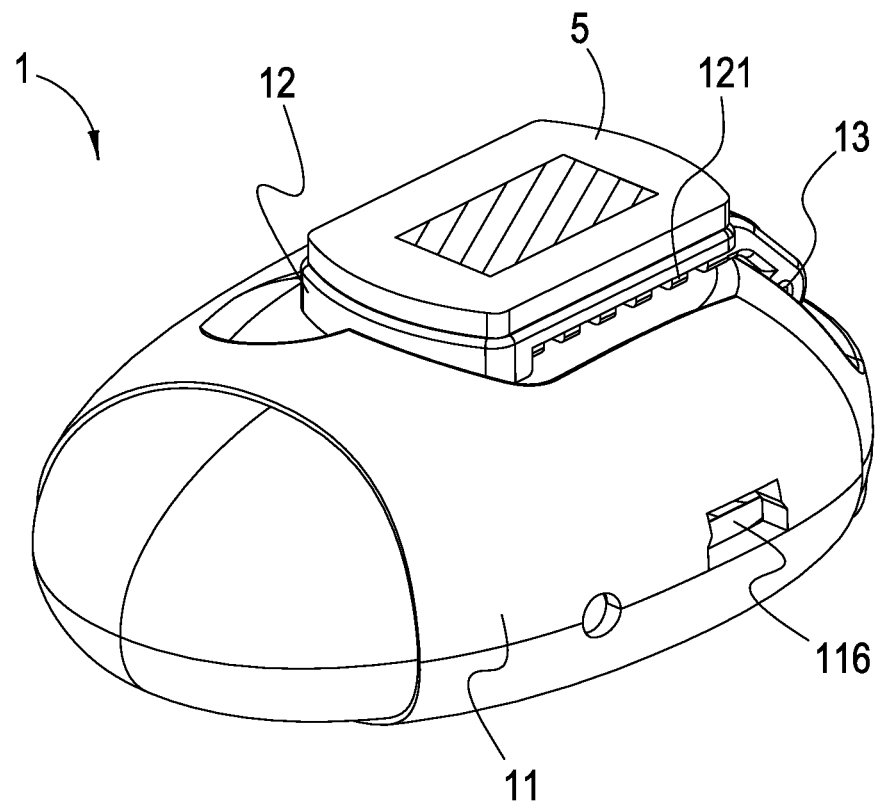
FIG. 4B illustrates a schematic assembled 3-D view of the second combination application of the magnetic control illumination device of the present invention.

Since the surface of the fixing base 12 has two powerful magnets 122, as shown in FIG. 4A and FIG. 4B, the fixing base 12 of the magnetic control illumination device 1 attaches to the surface of a metal plate 5 or a magnet via the powerful magnet 122 of the fixing base 12. As shown in FIG. 6B, since a safety helmet 6 on a user 7 is not made by metal materials, the fixing base 12 of the magnetic control illumination device 1 cannot attach to the surface of the safety helmet 6. Hence, the metal plate 5 being firstly adhered to the inner surface or surface (not shown in figure) of the safety helmet 6 is a solution.

Compared to other prior arts, the present invention has following advantages:

1. The present invention can be disposed on an umbrella, bicycle or safety helmet with a simple manual process, and the illumination device may be turned on or off with an easy way.
2. The present invention makes that the user is able to adjust the direction and angle of illumination by himself. The angle is expanded for 90-degree up and 90-degree down. The buckling ring is the key for clockwise and counterclockwise rotations for 360 degrees. Hence, the rang of illumination is wider, so that the scope of application is wider as well.

Although the invention has been disclosed and illustrated with reference to particular embodiments, the principles involved are susceptible for use in numerous other embodiments that will be apparent to persons skilled in the art. This invention is, therefore, to be limited only as indicated by the scope of the appended claims

What is claimed is:

1. A magnetic control illumination device comprising:
   a lighting member and a fixing base connecting with the back surface of the lighting member, the lighting member having at least one lighting component, a battery, a control circuit with a magnetic reed switch, the fixing base having at least one tenon structure for attaching to a tenon base and at least one powerful magnet, wherein the lighting member connects with the fixing base via a pivot structure, the pivot structure letting the lighting member open and close on the fixing base in a multi-stage way for adjusting plural lighting angles.

2. The magnetic control illumination device according to claim 1, wherein the lighting member further comprises a control switch connecting with the magnetic reed switch, the control switch having three states of continuous illumination, continuous non-illumination and automatic illumination.

3. The magnetic control illumination device according to claim 1, wherein the powerful magnet is disposed on a surface of the fixing base.

4. The magnetic control illumination device according to claim 1, wherein the lighting member attaches to a surface of a metal member or the surface, which internally is a metal material, of a member via the powerful magnet of the fixing base.

5. The magnetic control illumination device according to claim 1, wherein the lighting member connects with a buckling ring with the tenon base, the tenon structure of the lighting member inserting into the tenon base for the lighting member buckling up the buckling ring.

6. The magnetic control illumination device according to claim 5, wherein a bottom of the tenon base of the buckling ring has a shaft for the tenon base rotating on the buckling ring.

7. The magnetic control illumination device according to claim 5, wherein the buckling ring buckles up a lower runner of an umbrella or the horizontal rod or a vertical rod of a bicycle.

8. The magnetic control illumination device according to claim 1, wherein the lighting member further has a solar panel connecting with the battery for charging the battery.

9. The magnetic control illumination device according to claim 1, wherein the lighting member further has a USB connector connecting with the battery for charging the battery.

* * * * *